(12) United States Patent
Artini et al.

(10) Patent No.: US 7,330,781 B2
(45) Date of Patent: Feb. 12, 2008

(54) METHOD TO DETERMINE AND GUIDE AIRCRAFT APPROACH TRAJECTORY

(75) Inventors: Franck Artini, Toulouse (FR); Edward Strongman, Bretx (FR)

(73) Assignee: Airbus France, Toulouse (FR)

( * ) Notice: Subject to any disclaimer, the term of this patent is extended or adjusted under 35 U.S.C. 154(b) by 190 days.

(21) Appl. No.: 11/123,171

(22) Filed: May 6, 2005

(65) Prior Publication Data
US 2005/0261812 A1   Nov. 24, 2005

(30) Foreign Application Priority Data
May 18, 2004   (FR) .................................. 04 05384

(51) Int. Cl.
*G06F 17/00* (2006.01)
(52) U.S. Cl. ......................................... 701/16; 364/433
(58) Field of Classification Search ............ 701/16–18, 701/202, 205–207, 209–210, 11; 340/947, 340/951, 970, 977; 244/3.15
See application file for complete search history.

(56) References Cited

U.S. PATENT DOCUMENTS

| | | | | |
|---|---|---|---|---|
| 4,792,906 A | * | 12/1988 | King et al. ....................... | 701/5 |
| 4,862,372 A | * | 8/1989 | Appleford ........................ | 701/5 |
| 5,922,031 A | * | 7/1999 | Larrieu ............................ | 701/3 |
| 6,038,498 A | * | 3/2000 | Briffe et al. .................... | 701/3 |
| 6,134,500 A | * | 10/2000 | Tang et al. .................. | 701/202 |
| 6,181,987 B1 | * | 1/2001 | Deker et al. ..................... | 701/3 |
| 6,253,126 B1 | * | 6/2001 | Palmer .......................... | 701/14 |
| 6,289,270 B1 | * | 9/2001 | Baumgarten .................. | 701/26 |
| 6,438,469 B1 | | 8/2002 | Dwyer et al. | |
| 6,643,580 B1 | * | 11/2003 | Naimer et al. .............. | 701/206 |
| 6,816,780 B2 | * | 11/2004 | Naimer et al. .............. | 701/206 |
| 2002/0143439 A1 | * | 10/2002 | Morizet et al. ................. | 701/3 |
| 2004/0225420 A1 | * | 11/2004 | Morizet et al. ................. | 701/3 |
| 2005/0192717 A1 | * | 9/2005 | Tafs et al. ...................... | 701/3 |

FOREIGN PATENT DOCUMENTS

EP   0798685   10/1997

OTHER PUBLICATIONS

K. K. Dieter, et al.; "Low-level flight capability of a future military transport aircraft based on commercial avionics," Database Compendex 'Online! Engineering Information, Inc., New York, NY, US: XP002308965, Database accession No. EIX98114025910 & AIAA/IEEE Digital Avionics Systems Conference—Proceedings 1997 IEEE, Piscataway, NJ, USA, vol. 2, 1997, pp. 7.2-24-7.2-31.

* cited by examiner

*Primary Examiner*—Jack Keith
*Assistant Examiner*—Jonathan Goldfarb
(74) *Attorney, Agent, or Firm*—Stevens, Davis, Miller & Mosher, LLP

(57) ABSTRACT

A method to determine, and guide an aircraft on, an intermediate trajectory between a first trajectory, for low-altitude flight, and a second trajectory, from which a tactical landing is carried out, may include determining a point of transition which lies on the first trajectory. The point of transition represents the start of the intermediate trajectory and corresponds to the point where the aircraft must exit the first flight trajectory so as to reach an initial point of the second flight trajectory, under predetermined flight conditions. Upon determining the point of transition, the aircraft is guided along the intermediate trajectory interconnecting the point of transition and the initial point of the second trajectory.

12 Claims, 3 Drawing Sheets

METHOD TO DETERMINE AND GUIDE AIRCRAFT APPROACH TRAJECTORY

FIELD OF THE INVENTION

The present invention relates to a method and a device for guiding an aircraft.

BACKGROUND OF THE RELATED ART

More precisely, the guidance of the aircraft, in particular a military transport plane, is implemented at least over an intermediate trajectory between a first flight trajectory for a low-altitude flight, and a second flight trajectory which starts at an initial point, and from which trajectory a tactical landing is carried out.

The present invention applies therefore to a tactical landing, that is to say to a landing which is carried out on an unprepared runway, for example in the military field for discharging troops and hardware with a view to an unexpected action. To be able to carry out such a tactical landing under good conditions, it is necessary for the aircraft to arrive in a stabilized manner, at the right speed (with an appropriate acceleration), at the right altitude and in an aerodynamic configuration appropriate to said initial point corresponding to the start of said (second) flight trajectory, at the end of which the tactical landing will be carried out.

Additionally, to be able to carry out such a tactical landing as discretely as possible, the aircraft is generally made to fly along a low-altitude approach trajectory, up to said second flight trajectory, to allow the aircraft to benefit from masking by the terrain and thus not be easily detectable.

Moreover, to attempt to reach said initial point under the best possible conditions, the pilot of such an aircraft generally has at his disposal only information relating to a point of deceleration which is situated upstream of said initial point, and from which he is advised to decelerate the aircraft. However, this point of deceleration takes no account of the profile of the terrain on the approach to the landing zone, and the pilot must therefore manually adjust the piloting of the aircraft so as to reach said initial point under the aforesaid particular conditions, this of course being very difficult to achieve.

SUMMARY OF THE INVENTION

The present invention relates to a method of guiding an aircraft at least over an intermediate trajectory between a first flight trajectory for a low-altitude flight and a second flight trajectory which starts at an initial point, and from which trajectory a tactical landing is carried out, which method of guidance makes it possible to remedy the aforesaid drawbacks.

To this end, according to the invention, said method of guidance is noteworthy in that:

a) a point of transition which lies on said first flight trajectory is determined, which represents the start of said intermediate trajectory, and which corresponds to the point where the aircraft must exit said first flight trajectory so as to reach said initial point under predetermined flight conditions; and b) said point of transition is used to guide the aircraft between said first and second flight trajectories.

Thus, by virtue of the invention, the point (point of transition) where the aircraft must exit said first flight trajectory to be able to reach said initial point, under predetermined flight conditions, is known, making it possible to carry out a tactical landing under the best possible conditions.

Preferably, said predetermined flight conditions relate to at least certain of the following conditions:
- a predetermined speed;
- a predetermined altitude;
- a predetermined aerodynamic configuration of the aircraft;
- a rate of deceleration;
- a parachute drop schedule to be complied with; and
- a maximum ground slope for regaining the parachute drop altitude.

The present invention is appropriate both to manual guidance, and to automatic guidance in terms of trajectory and speed (time). Thus, advantageously:

in a first variant pertaining in particular to manual guidance, in step b), said point of transition is presented to a pilot of the aircraft; and in a second variant, when the aircraft is guided automatically, the automatic guidance for following said intermediate trajectory is triggered at said point of transition.

In a particular embodiment, in step a), to determine said point of transition, a first straight line exhibiting a first slope which is positive and a second straight line exhibiting a second slope which is negative are projected into the vertical plane, from said initial point, upstream;

the various points of crossover between, on the one hand, said first and second straight lines and, on the other hand, said first flight trajectory are determined, in the vertical plane; and one of said points of crossover, namely that which is situated closest to said initial point, is chosen as point of transition, so as to benefit for as long as possible from the masking by the terrain.

Moreover, advantageously, said intermediate trajectory corresponds to a straight line segment connecting said point of transition to said initial point.

Furthermore, to afford additional aid making it possible in particular to bring the aircraft in the most stabilized manner possible to said initial point, advantageously:

in step a), in addition:
at least one first auxiliary point corresponding to a point of change of speed where the aircraft (A) must decelerate is determined; and/or
at least one second auxiliary point corresponding to a point of change of aerodynamic configuration of the aircraft is determined. Provision is generally made for several second auxiliary points which pertain respectively to the various successive aerodynamic configurations to be instructed before arriving at the suitable aerodynamic configuration; and in step b), said first auxiliary point and/or said second auxiliary point is/are used to pilot the aircraft.

In a particular embodiment, said second flight trajectory, from which the tactical landing is carried out, is inserted into a low-altitude flight section comprising:
said first flight trajectory, for a low-altitude flight, upstream of said second flight trajectory; and
a third flight trajectory, likewise for a low-altitude flight, downstream of said second flight trajectory.

Thus, by virtue of this particular embodiment, the aircraft can continue to fly at low altitude (or return to a low-altitude flight) and to benefit from the masking by the terrain, especially when the tactical landing was unable to be carried out.

The present invention also relates to a device for guiding an aircraft at least over an intermediate trajectory between a first flight trajectory for a low-altitude flight and a second flight trajectory which starts at an initial point, and from which trajectory a tactical landing is carried out.

According to the invention, said guidance device is noteworthy in that it comprises:

first means for determining a point of transition which lies on said first flight trajectory which represents the start of said intermediate trajectory, and which corresponds to the point where the aircraft must exit said first flight trajectory so as to reach said initial point under predetermined flight conditions; and second means which use said point of transition to aid the guidance of the aircraft between said first and second flight trajectories.

Moreover, in a particular embodiment, said second means comprise:

means of visualization for presenting said point of transition on a display screen, of head-up type or of head-down type, in horizontal and/or vertical section; and/or an automatic guidance system (triggerable by a pilot) for automatically guiding said aircraft at least along said intermediate trajectory.

The device in accordance with the invention therefore affords valuable aid allowing an aircraft flying at low altitude to reach the start of a tactical landing phase under the best possible conditions, both under manual guidance and under automatic guidance.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
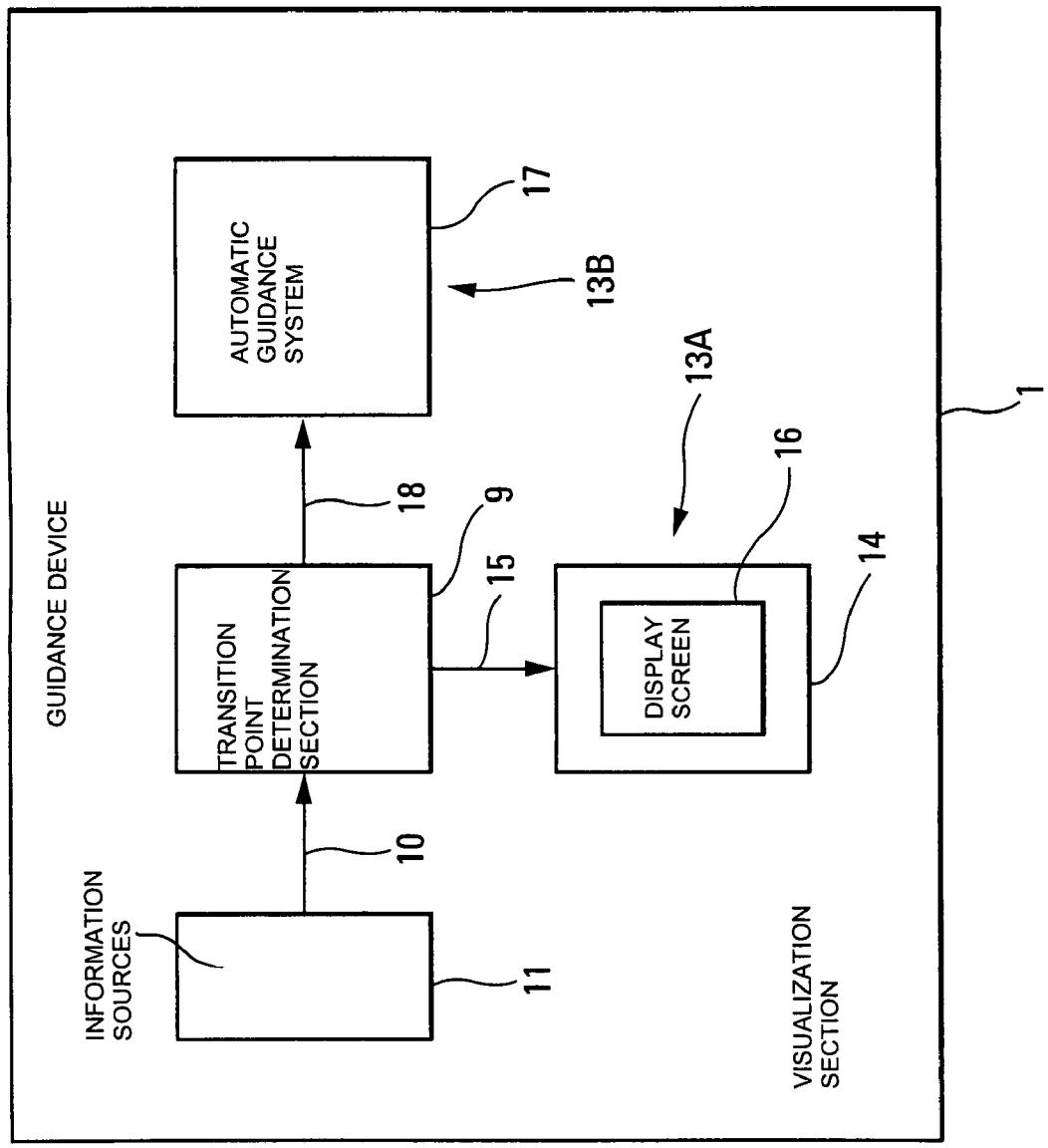
FIG. 1 is the schematic diagram of a device in accordance with the invention.

The guidance device considered here is a standard guidance device for an aircraft A, in particular for a military transport plane, which allows the implementation, in standard fashion, of manual guidance by a pilot of the aircraft A and/or of automatic guidance, for example by way of an automatic piloting system. The essential characteristics of such a guidance device are known and do not come directly into the framework of the present invention. Also, for the purpose of simplifying the drawing, only the characteristics used for the implementation of the present invention have been represented in FIG. 1.

Figure 2:
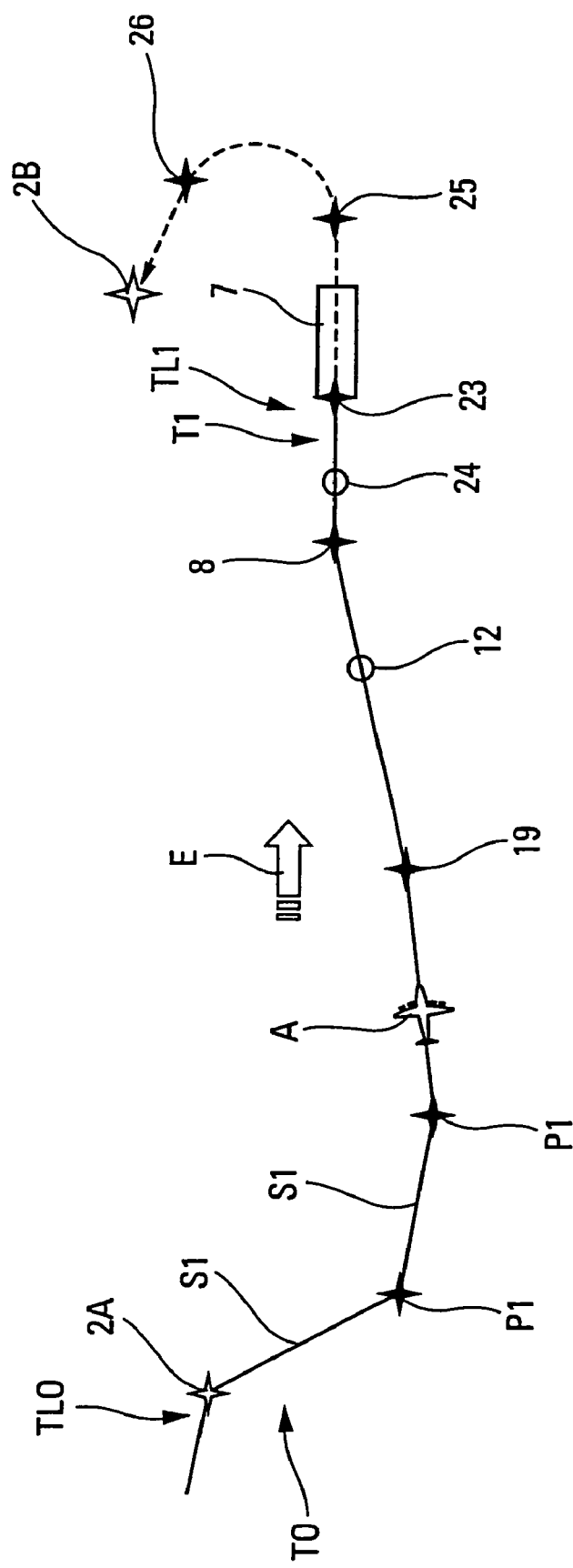
FIGS. 2 and 3 are two graphics, respectively in the lateral plane and in the vertical plane, contributing to a proper explanation of the essential characteristics of the present invention.
Figure 3:
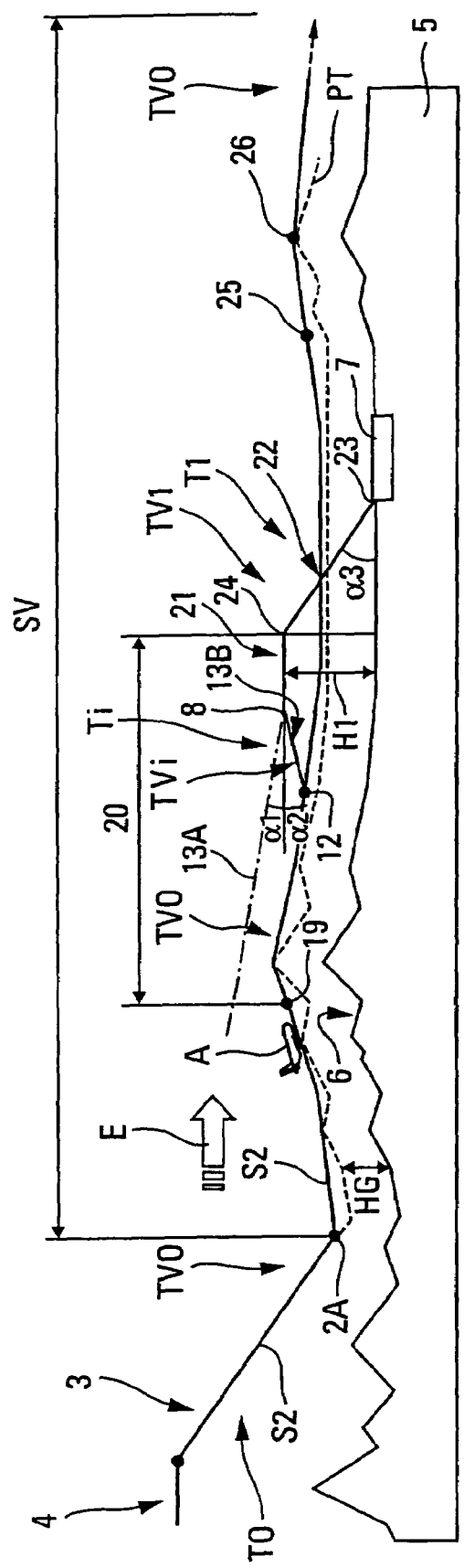

Said guidance device 1 makes it possible to guide the aircraft A along a flight trajectory TO comprising a lateral trajectory TLO defined in a lateral plane and represented partially in FIG. 2 and a vertical trajectory TVO (or flight profile) defined in a vertical plane and represented partially in FIG. 3. As may be seen in this FIG. 3, this flight trajectory TO comprises a section SV of low-altitude flight which commences at a point 2A, for example following a descent 3 from a phase of cruising 4 at stabilized altitude, and terminates at a point 2B. At the level of this low-altitude flight section SV, the flight trajectory TO (at low altitude) must allow the aircraft A to follow as closely as possible the terrain overflown 5. To do this, the vertical trajectory TVO is calculated, over this low-altitude flight section SV, from a terrain profile PT which is situated (at a predetermined guard height HG) above the relief 5 of the terrain 5 overflown, as represented in FIG. 3.

In a preferred embodiment, said flight trajectory TO is a so-called string-like trajectory which consists of rectilinear segments (rectilinear segments S1 in the lateral plane, separated by waypoints P1 as represented in FIG. 2, and rectilinear segments S2 in the vertical plane as represented in FIG. 3), whose lateral and vertical transitions are arcs of a circle of constant radius which stem from considerations of preset speed and of maximum load factors allowable. Of course, the flight trajectory may also be continuously curved in the vertical plane and/or in the lateral plane. This flight trajectory TO can be an anticipated trajectory, determined with the aid of predicted climb and descent performance. Moreover, it is calculated with the aid of a digital database for the terrain and hugs, as closely as possible, the configuration of the relief 6 of the terrain 5 overflown.

The present invention relates to the case where, during a flight over a low-altitude flight section SV such as this, a tactical landing must be implemented. Such a tactical landing consists in landing the aircraft A on a determined and unprepared ground landing zone 7. To be able to carry out such a tactical landing under good conditions, it is necessary for the aircraft A to arrive in a stabilized manner, at an appropriate speed and in the appropriate aerodynamic configuration, at an initial point 8 corresponding to the start of a stretch of flight trajectory T1 (with a lateral trajectory TL1 and a vertical trajectory TV1 which is situated at a height H1 above the ground), from which trajectory the tactical landing is carried out. It must also comply with presets for slope, acceleration, time, etc.

According to the invention, to allow the aircraft A to arrive under the aforesaid conditions at said initial point 8, the guidance device 1 in accordance with the invention comprises:

means 9 which are connected by a link 10 to a set 11 of information sources and which make it possible to determine a point of transition 12:

which lies on said low-altitude flight trajectory TO;

which represents the start of an intermediate trajectory Ti, whose vertical trajectory TVi is represented in FIG. 3, said intermediate trajectory Ti making it possible to connect said trajectories TO and T1; and which corresponds to the point where the aircraft A must exit said low-altitude flight trajectory TO so as to reach said initial point 8 (of the flight trajectory T1 of the tactical landing phase) under predetermined flight conditions. In a preferred embodiment, said predetermined flight conditions relate to at least:

a predetermined speed;

a predetermined altitude;

a predetermined aerodynamic configuration of the aircraft (A);

a rate of deceleration;

a parachute drop schedule to be complied with; and a maximum ground slope for regaining the parachute drop altitude; and means 13A, 13B which use said point of transition 12 to aid in guiding the aircraft A between said flight trajectories T0 and T1.

Thus, by virtue of said device 1, the point (point of transition 12) where the aircraft A must exit said low-altitude flight trajectory T0 so as to be able to reach said initial point 8 under appropriate flight conditions is known, making it possible to carry out, from the flight trajectory T1, a tactical landing under the best possible arrangements, as specified hereinafter.

It will be noted that by virtue of a low-altitude approach to the landing zone 7, the aircraft A can benefit from effective masking by the terrain 5 overflown.

Within the framework of the present invention, the expression particular "aerodynamic configuration" is understood to mean a particular combination of the positions of movable elements (lift-enhancing flaps, landing gear, etc.), on which the aerodynamic characteristics of the aircraft A depend.

In a particular embodiment:
said means 13A comprise means of visualization 14 which are connected by a link 15 to the means 9 and which make it possible to present on a display screen 16 in particular said point of transition 12, as well as other information specified hereinbelow. Said display screen 16 can be a head-up screen or a head-down screen. It may also be a horizontal display or a vertical display;
said means 13B comprise a standard automatic guidance system 17 which is connected by a link 18 to said means 9. This standard automatic guidance system 17 comprises means for determining piloting orders and means for actuating controlled members (control surfaces, etc.), to which these piloting orders are applied.

The present invention applies equally well to a flight under VMC conditions (VMC standing for "Visual Meteorological Conditions"), that is to say meteorological fly-by-sight conditions which are expressed as a function of visibility, of distance with respect to the clouds and to the ceiling, conditions equal to or greater than specified minima, as to flight under IMC conditions (IMC standing for "Instrument Meteorological Conditions"), that is to say meteorological instrument flight conditions which are expressed as a function of visibility, of distance with respect to the clouds and the ceiling, namely conditions less than the minima specified for the meteorological fly-by-sight conditions.

Said set 11 of information sources provides in particular:
the low-altitude flight trajectory T0, such as predicted;
the tactical landing procedure planned, with the flight trajectory T1. A tactical landing procedure represents a section of the flight plan which defines a tactical landing in the planned mission, that is to say an intermediate landing on an unprepared runway 7;
a current speed preset for the aircraft A;
the speed vector (position, speed, aerodynamic configuration) of the aircraft A.

Said set 11 of information sources also provides the time, the slope, the acceleration, . . . , chosen by the operator.

Thus, by virtue of the device 1 in accordance with the invention, the aircraft A can reach the point 8 of the flight trajectory T1 in a stabilized manner, that is to say at the predetermined speed and at the predetermined altitude and in the envisaged aerodynamic configuration, while complying with the presets for time, for slope, for deceleration. This is very important for allowing tactical landing under the best possible stability conditions, after a low-altitude approach which is often unstable, since the aircraft A then follows the relief 6 of the terrain 5 as much as possible, for masking reasons in particular. The device 1 in accordance with the invention therefore makes it possible to increase the comfort of piloting, and to reduce the workload of the crew in such an approach phase which is often very demanding, while making it possible to reach said initial point 8 under the best possible conditions.

It will be noted that, during automatic guidance, if, at said point of transition 12, the corresponding guidance mode is not activated, the aircraft A continues to fly at low altitude along said flight trajectory T0 (at low altitude). Likewise, during manual guidance, the pilot may decide, in particular when the current operational conditions do not so permit, not to engage the tactical landing procedure at said point of transition 12 and to continue to fly at low altitude.

In a particular embodiment, the means 9 determine said point of transition 12, by carrying out the following operations:
they project into the vertical plane, from said initial point 8, as represented in FIG. 3, upstream (that is to say rearward, in the direction opposite to the direction of flight E of the aircraft A) a first straight line 13A exhibiting a positive slope $\alpha 1$ and a second straight line 13B exhibiting a negative slope $\alpha 2$. Preferably, the two slopes $\alpha 1$ and $\alpha 2$ exhibit the same absolute value, for example 3°;
they determine, in the vertical plane, the various points of crossover between, on the one hand, said straight lines 13A and 13B, and, on the other hand, said vertical trajectory TV0; and
they select as transition point 12, one of said crossover points thus determined, namely that which is situated closest to said initial point 8.

In the example represented in FIG. 3, the vertical trajectory TVI of the intermediate trajectory Ti therefore corresponds to the segment of said straight line 13B, which is situated between the initial point 8 and the point of transition 12 determined in the manner specified hereinabove.

Furthermore, in a particular embodiment, said means 9 additionally determine the following points, which are presented to a pilot of the aircraft A by the display means 14;
auxiliary points corresponding to points of change of speed, where the aircraft A must decelerate, according to a predetermined rate of deceleration, so as to reach said initial point 8 in a stabilized manner at the right speed. This is very important for being able to land at the right speed. The first of said auxiliary points, 19, may be different from said point of transition 12, as represented in FIG. 3; and
additional auxiliary points (not represented) corresponding to points of change of aerodynamic configuration of the aircraft A. These additional auxiliary points also allow the aircraft A not to arrive too fast at said initial point 8.

Thus, by virtue of the invention, the tactical landing can be carried out under the best possible conditions.

To carry out such a tactical landing, the vertical trajectory TV1 generally comprises a horizontal stretch 21 exhibiting a level situated at the height H1 above the ground 6 and a descent stretch 22 exhibiting a constant slope $\alpha 3$, finishing at the end 23 upstream (in the direction of flight E of the aircraft A) of the runway 7. The descent stretch 22 commences at a start of descent point 24. The latter point forms together with the point 19 a preparation phase 20.

In FIGS. 2 and 3 are additionally represented:
a point 25 of start of pick-up of the low-altitude trajectory T0 after a tactical landing on the runway 7 and a subsequent takeoff; and
a point 26 of end of tactical landing procedure, in particular when the tactical landing was unable to be carried out.

Represented in FIG. 2 by dashes downstream of the point 23 is the trajectory followed by the aircraft A, when the tactical landing was unable to be carried out.

Moreover, as the point 2B of end of the low-altitude flight section SV is situated downstream of said points 25 and 26, in the direction of flight E of the aircraft A, the latter can continue to fly at low altitude after a tactical landing or at the end of a tactical landing procedure (without actual landing), and thus continue to benefit from masking by the terrain 5.

The invention claimed is:

1. A method of determining, and guiding an aircraft over, an intermediate trajectory between a first flight trajectory, for low-altitude flight, and a second flight trajectory, which starts at an initial point and from which a tactical landing is carried out, the method comprising:
receiving, by a processor, information of the aircraft's first flight trajectory and the initial point of the second flight trajectory;
determining, with the processor, a point of transition from the first flight trajectory to the intermediate trajectory where the aircraft must depart from the first flight trajectory so as to reach the initial point of the second flight trajectory under predetermined flight conditions; and
automatically guiding, with an automatic guidance system, the aircraft along the intermediate trajectory defined by the endpoints of the point of transition and the initial point of the second flight trajectory, wherein:
to determine the point of transition, the processor:
computationally idealizes a first straight line having a positive slope and a second straight line having a negative slope that are projected into an upstream vertical plane of the aircraft's flight from the initial point of the second flight trajectory;
identifies all points at which either the first straight line or the second straight line intersect the first flight trajectory in the upstream vertical plane; and
selects the point of intersection closest to the initial point of the second flight trajectory as the point of transition,
the slopes of the first and second straight lines are determined in accordance with the predetermined flight conditions, and
the intermediate trajectory corresponds to a straight line segment connecting the point of transition and the initial point of the second flight trajectory.

2. The method of claim 1, wherein the predetermined flight conditions include at least one of the following aircraft flight conditions:
a predetermined speed;
a predetermined altitude;
a predetermined aerodynamic configuration of the aircraft; and
a rate of deceleration.

3. The method of claim 1, wherein the determined point of transition is presented to a pilot of the aircraft.

4. The method of claim 1, wherein the automatic guidance for following the intermediate trajectory is triggered at the point of transition.

5. The method of claim 1, further comprising:
determining, with the processor, an auxiliary point where the aircraft must decelerate so as to reach the initial point of the second flight trajectory in accordance with the predetermined flight conditions; and
automatically decelerating the aircraft, using the automatic guidance system, at the determined auxiliary point, wherein:
the processor determines the auxiliary point based upon the received information of the aircraft's first flight trajectory and initial point.

6. The method of claim 1, further comprising:
determining, with the processor, an auxiliary point where the aircraft must change its aerodynamic configuration so as to reach the initial point of the second flight trajectory in accordance with the predetermined flight conditions; and
automatically changing the aerodynamic configuration of the aircraft, using the automatic guidance system, at the determined auxiliary point, wherein:
the processor determines the auxiliary point based upon the received information of the aircraft's first flight trajectory and initial point.

7. The method of claim 1, wherein the processor computationally interposes the second flight trajectory into a low-altitude flight section comprising the first flight trajectory and a third flight trajectory that is downstream of the second flight trajectory.

8. The method of claim 1, wherein the method is implemented by avionics of the aircraft.

9. A device for determining, and guiding an aircraft over, an intermediate trajectory between a first flight trajectory, for low-altitude flight, and a second flight trajectory, which starts at an initial point and from which a tactical landing is carried out, the device comprising:
a processor that determines, from information of the aircraft's first flight trajectory and the initial point of the second flight trajectory, a point of transition from the first flight trajectory to the intermediate trajectory where the aircraft must depart from the first flight trajectory so as to reach the initial point of the second flight trajectory under predetermined flight conditions; and
a section that aids the guidance of the aircraft along the intermediate trajectory defined by the endpoints of the point of transition and the initial point of the second flight trajectory, wherein:
to determine the point of transition, the processor:
computationally idealizes a first straight line having a positive slope and a second straight line having a negative slope that are projected into an upstream vertical plane of the aircraft's flight from the initial point of the second flight trajectory;
identifies all points at which either the first straight line or the second straight line intersect the first flight trajectory in the upstream vertical plane; and
selects the point of intersection closest to the initial point of the second flight trajectory as the point of transition,
the slopes of the first and second straight lines are determined in accordance with the predetermined flight conditions, and
the intermediate trajectory corresponds to a straight line segment connecting the point of transition and the initial point of the second flight trajectory.

10. The device of claim 8, wherein the section for aiding the guidance of the aircraft comprises a visualization section that presents the point of transition on a display screen.

11. The device of claim 9, wherein the section for aiding the guidance of the aircraft comprises an automatic guidance system that automatically guides the aircraft along the intermediate trajectory.

12. The device of claim 9, wherein the device is integrated within avionics of the aircraft.

* * * * *